United States Patent [19]

Hunter et al.

[11] 4,134,680

[45] Jan. 16, 1979

[54] VEHICLE HEADLIGHT TESTING APPARATUS

[75] Inventors: Lee Hunter, Ladue; David A. Senften, Florissant, both of Mo.

[73] Assignee: Hunter Engineering Company, Bridgeton, Mo.

[21] Appl. No.: 766,041

[22] Filed: Feb. 7, 1977

[51] Int. Cl.² ............................. G01J 1/04; G01J 1/46
[52] U.S. Cl. ................................... 356/121; 250/209; 307/311
[58] Field of Search ............................... 356/121–123, 356/222; 33/288, 335; 250/202, 209, 553; 307/311, 355, 358

[56] References Cited

U.S. PATENT DOCUMENTS

| 2,291,114 | 7/1942 | Squyer | 356/121 |
| 2,552,116 | 5/1951 | Rodeghiero | 356/122 |
| 2,958,134 | 11/1960 | Wilkerson | 356/121 |
| 2,979,983 | 4/1961 | Carrigan | 356/121 |

OTHER PUBLICATIONS

Powell, K. E., "Field Disburbance Sensing Unit", IBM Tech. Disc. Bull. vol. 18, 12-1975, pp. 2275–2276.

Primary Examiner—John K. Corbin
Assistant Examiner—Wm. H. Punter
Attorney, Agent, or Firm—Gravely, Lieder & Woodruff

[57] ABSTRACT

A vehicle headlight testing apparatus incorporating alignment means to locate the headlight aiming relative to the plane of tracking of the rear wheels of a vehicle, means to bring the tester into a position to compensate for shop floor out-of-level conditions, and optical and photo-electrical means for locating the headlight beam pattern and for manipulating the tester so that horizontal and vertical scales will show whether the headlight has its beam aimed within tolerances permitted by the prevailing Lighting Inspection Code.

12 Claims, 11 Drawing Figures

FIG.3

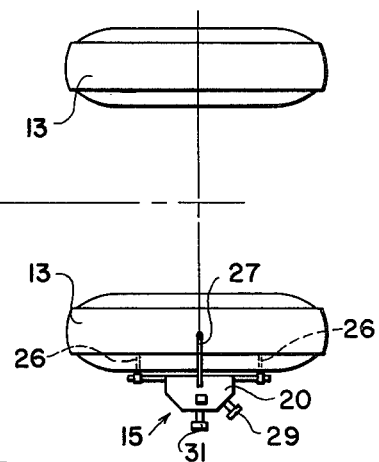
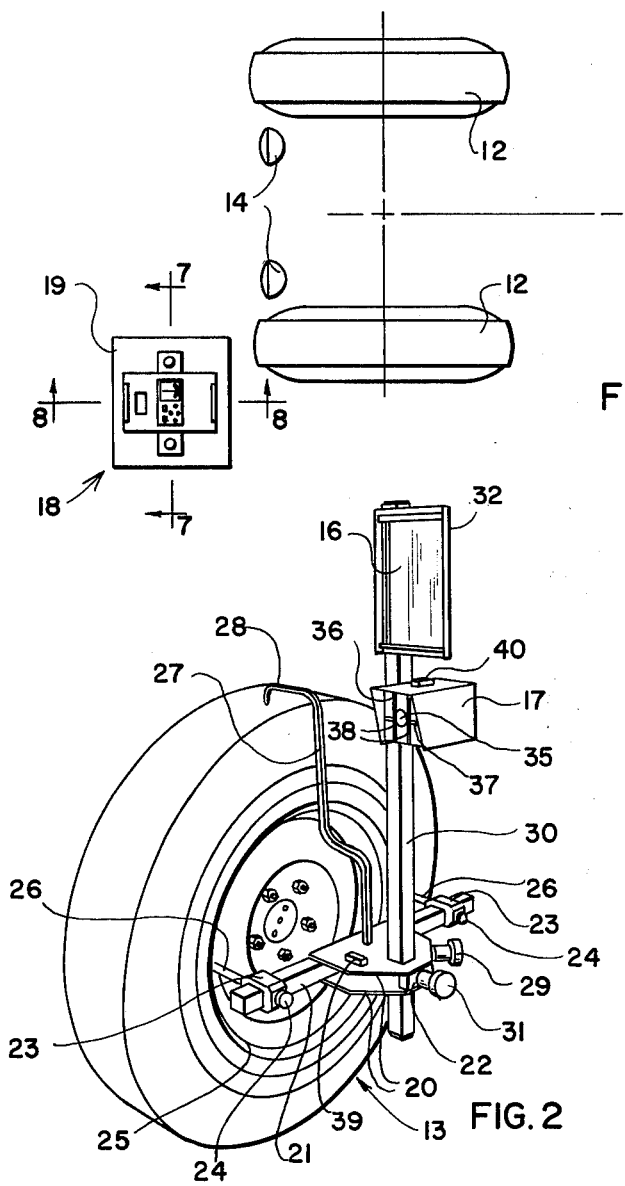
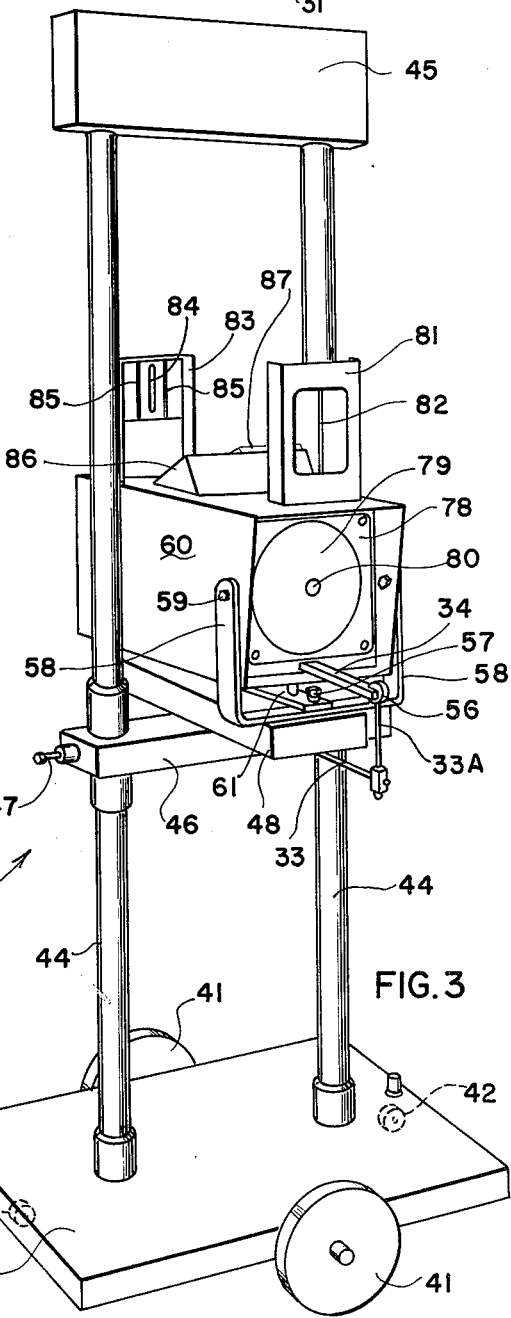
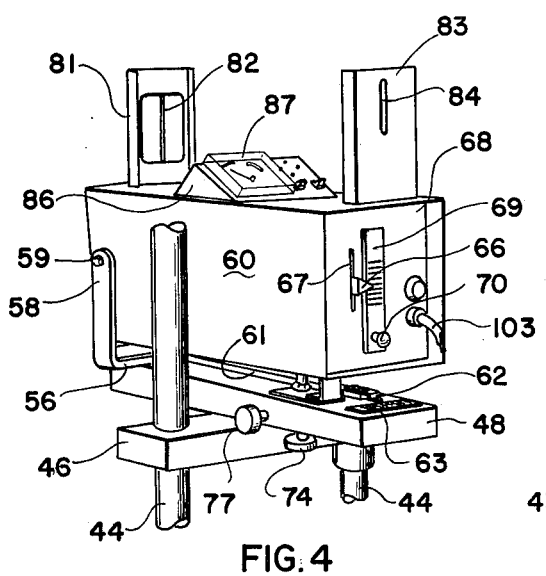

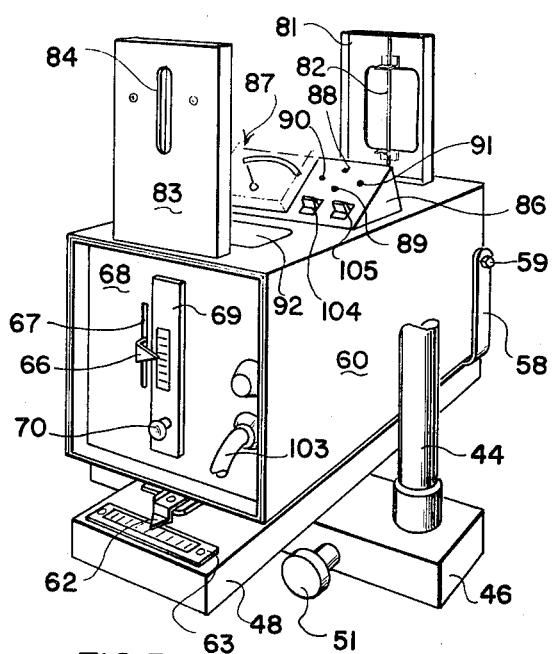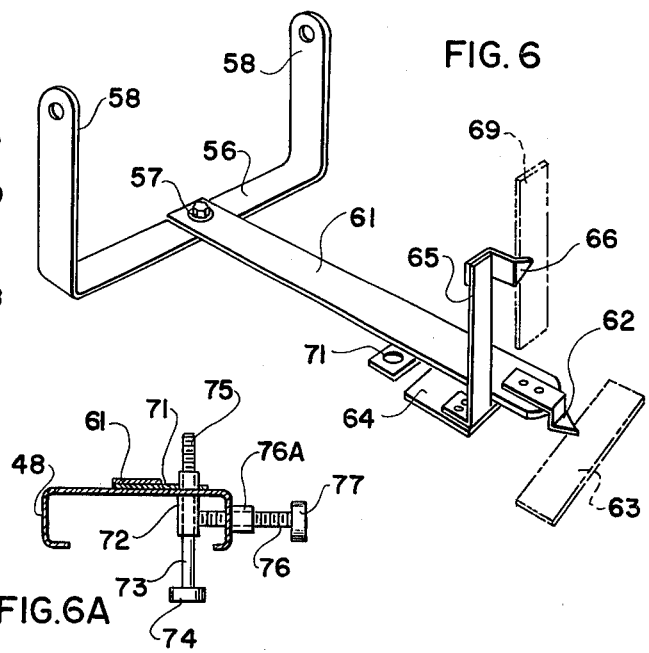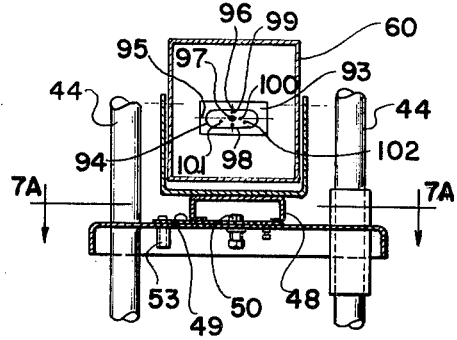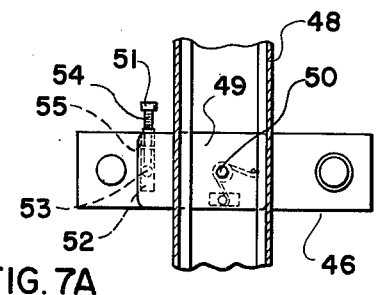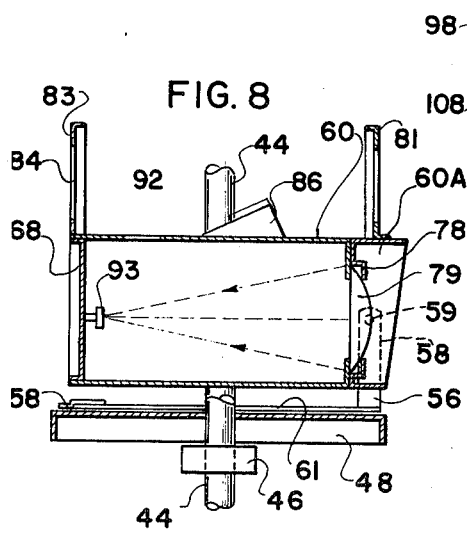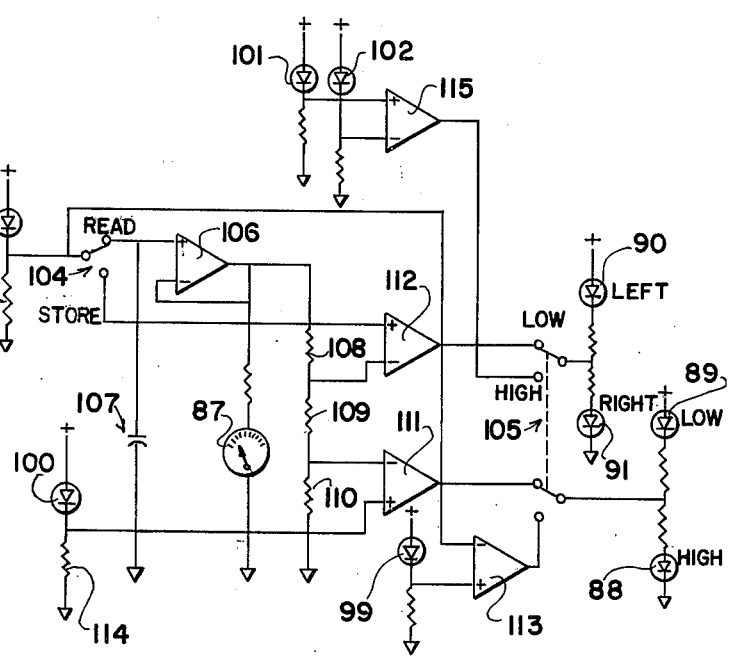

VEHICLE HEADLIGHT TESTING APPARATUS

BRIEF SUMMARY OF THE INVENTION

This invention relates to vehicle headlight testing apparatus and to improvement in such testers to more accurately determine the aiming of the headlight beam axis.

Headlight testing apparatus has varied from an instrumentality adapted to fit directly on the head lamp as disclosed by Falge in U.S. Pat. Nos. 2,111,585 issued Mar. 22, 1938, and 2,144,838 issued Jan. 24, 1939, to the independently floor mounted headlight testers disclosed in Weaver U.S. Pat. No. 2,161,886 issued June 13, 1939, or Graham U.S. Pat. No. 2,167,803 issued Aug. 1, 1939, or Falge et al U.S. Pat. Nos. 2,176,214 or Falge 2,176,215 issued Oct. 17, 1939 or MacMillan U.S. Pat. No. 2,215,224 issued Sept. 17, 1940, or Squyer U.S. Pat. No. 2,291,114 issued July 28, 1942. Headlight testing apparatus of the above character has generally been limited to determining the beam aim of the headlights in relation to the alignment of some part of the sheet metal of the vehicle body. This is based on the assumption that the vehicle body is symmetrically accurate and will move in a direction parallel to the longitudinal axis of the body. However, in actual practice the vehicle will always tend to move in a direction dictated by the alignment of the rear wheels relative to the longitudinal axis of the body or chassis. If the plane of rotation of the rear wheels is perpendicular to the longitudinal axis of the vehicle body or chassis, the prior art apparatus can produce reasonably accurate results. If, on the contrary, the plane of rotation of these wheels is not perpendicular to the longitudinal axis of the vehicle body, or chassis, then inaccurate headlight tests will result. In the latter event the headlight beam aim will be directed more toward the path of an oncoming vehicle or more toward the right side of the road, thereby being in violation of the SAE regulations for aiming of the headlights.

The present invention incorporates in a unique way apparatus to overcome the deficiencies of the prior art apparatus and produce accurate results which satisfy the SAE regulations. More specifically, the apparatus of the present invention incorporates means to calibrate the headlight testing portion of the apparatus for rear wheel plane of rotation, whereby subsequent determinations made on the aiming of the headlights will reflect the actual heading of the vehicle when in forward motion and the existing alignment of the headlight beams in relation to that motion, rather than to the axis of the vehicle body or chassis.

In addition to overcoming the problem of the prior art apparatus, the present invention provides improved means to calibrate the headlight tester for the particular shop floor out-of-level condition so that specifically prepared and accurately leveled floors are not required, and it also provides improved optical and photo-electronic means for finding the beam pattern of a headlight, as well as for subsequent aiming of the headlight to restore it to the required position.

BRIEF DESCRIPTION OF THE DRAWINGS

A presently preferred embodiment of the headlight tester is shown in the accompanying drawings, wherein:

FIG. 1 is a general schematic plan view of the vehicle wheels and headlight lamps in position such that the tester apparatus of this invention is seen in operative position relative to the left side wheels;

FIG. 2 is a perspective view of the calibration light and alignment mirror mounted on the left rear wheel in operative position;

FIG. 3 is a perspective view from the front of the headlight tester assembly, and as seen in FIG. 1 is initially positioned adjacent the left front wheel to cooperate with the calibration light and alignment mirror shown in FIG. 2;

FIG. 4 is a perspective view from the left rear of the headlight tester showing further details thereof;

FIG. 5 is a greatly enlarged perspective view from the right rear of the headlight tester showing further details;

FIG. 6 is a perspective view of portions of the mounting yoke assembly associated with the headlight tester cabinet to adjust the position thereof horizontally and vertically;

FIG. 6A is a fragmentary view of adjusting means associated with the platform and operable on the headlight tester cabinet to change its position horizontally and vertically;

FIG. 7 is a sectional elevational view of the headlight tester taken along line 7—7 in FIG. 1;

FIG. 7A is a view taken along line 7A—7A in FIG. 7.

FIG. 8 is a fragmentary sectional elevational view of the headlight tester showing the lens and photo-sensitive means taken along line 8—8 in FIG. 1; and FIG. 9 is a schematic electrical circuit diagram of the electronic components embodied in the headlight tester.

DETAILED DESCRIPTION OF THE INVENTION

The presently preferred embodiment of the invention is illustrated in schematic form in FIG. 1 in association with a vehicle represented by a set of front steerable wheels 12, a set of rear wheels 13, and a pair of headlights 14. The wheels 12 and 13 are located on a shop floor which does not require more than the usual care in getting it close to level. However, certain provisions are made to compensate the headlight tester for normally expected out-of-level shop floors in order to obtain accurate results. Still other provisions are made to bring the headlight tester into alignment with the direction of straight ahead travel of the vehicle by relating the headlight tester to the plane of rotation of the vehicle rear wheels.

Thus, in FIGS. 1 and 2 there is shown a target assembly which includes a mirror and calibration light assembly 15 which is mounted on the left rear wheel 13 so that the mirror 16 and box 17 housing the calibration light (FIG. 2) are facing forwardly toward the left front wheel 12. The headlight tester assembly 18 supported on a wheeled carriage 19 is located adjacent the front of the vehicle so that the carriage 19 is positioned to roll along a path generally perpendicular to the longitudinal heading of the vehicle with the headlight tester spaced from the headlights 14 approximately 12 to 18 inches. The carriage 19 is constructed with rollers or wheels that will maintain movement in a substantially straight line and along a desired path across the front of the vehicle from headlight to headlight, and to the side sufficiently to have the headlight tester assembly 18 in view of the assembly 15.

The mirror and calibration light target assembly 15 is seen in more detail in FIG. 2. This target assembly includes a frame of two plates 20 connected along the inner margins to the top and bottom of a box beam 21, and connected to a block 22 at the outer margin. The opposite ends of the beam 21 carry adjustable slide brackets 23 and a set screw 24 is provided to fix each bracket in adjusted position so that together they match the diameter of the vehicle wheel rim 25. Each bracket carries a wheel rim probe 26 of substantially equal length. In addition the frame plates carry a support rod 27 formed with a hook 28 at the outer end in position to engage the tire tread. The ends of the probes 26 and the support hook 28 are all located in the same plane which is perpendicular to the frame plates 20. The support rod is adjustable relative to the frame plates and can be locked in position by a set screw (not shown) operated by the knob 29. In adjusting the slide brackets 23 care must be exercised to keep the support rod opposite the center of the wheel.

The assembly 15 includes a vertically directed and adjustable post 30 having its lower end passing through the frame plates 20 adjacent the block 22 where a set screw operating knob 31 is located. The upper end of the post carries a frame 32 for the mirror 16 which is perpendicular to the plane of the wheel and the plane of the frame plates 20. Just below the mirror frame 32, there is a box 17 containing a battery (not shown) to energize a light bulb 35 located at the face plate 36 in the forward end of the box 34. The bulb 35 is located so as to be on the horizontal index line 37 and between parallel vertical index lines 38. When constructed in the manner seen in FIG. 2 the assembly can be adapted to suit a given wheel rim size by sliding the brackets 23 for the rim probes in or out and by adjusting the length of the support 27 so that the beam 21 lies nearly at the horizontal diameter of the wheel rim. The assembly 15 is jockeyed on the wheel rim and tire until bubble level 39 on the frame plate 20 and bubble level 40 on the box 34 are centered, thereby placing the assembly 15 in operating position relative to the plane of rotation of the rear wheel 13.

The headlight tester assembly is seen in FIGS. 3, 4, and 5, and in certain details in FIGS. 6 and 7. In general the assembly is mounted on a carriage 19 which is supported by principal tracking wheels 41 fast on a common axle (not shown) so they rotate together and cause the carriage 19 to maintain a straight line direction of travel. The carriage is provided with a pair of auxiliary casters 42 and 43 which keep the carriage level and facilitate its movement. A pair of guide columns 44 are fixed in the carriage 41 and extend upwardly in parallel to a head box 45. The columns 44 guide the travel of a carrier 46 which slides on the columns, and the weight of the carrier 46 and all of the components supported thereby is counter balanced by straps fastened to the carrier 46 and wound on spring loaded take-up drums in the head box (these particular counter balancing components have not been shown in order to simplify the drawing disclosure). Suffice it to say that the take-up drums and friction in the system tends to keep the carrier 46 in what ever position is selected, and a lock screw 47 (FIG. 3) is provided to assure a fixed location.

The carrier 46 supports a platform 48 (FIGS. 4, 5, 7 and 7A) in the form of a channel open at the bottom. The platform has a plate 49 fixed at its underside to receive a pivot pin 50 thereby allowing the platform to be moved angularly in a horizontal plane between the columns 44 under the control of an adjusting knob 51. The top of the carrier is formed with a slot 52 (FIG. 7A) located under a portion of the plate 49 at one side of the platform 48. A tab 53 fixed to the plate projects through the slot to lie in the path of and operably connected to a screw 54 which threads through a nut 55 fixed to the side wall of the carrier. When the exposed knob 51, which is connected to screw 54, is turned the plate 49 is swiveled about the pivot 50 and turns the platform 48.

The platform 48 supports a U-shaped yoke 56 (FIGS. 3 and 6) in which the center portion is movable about a pivot pin 57 supported in the underlying end of the platform 48, and the spaced arms 58 extend upwardly and are pinned by pivots 59 to the forward end of the headlight tester cabinet 60. Thus, the cabinet 60 is pivotally movable horizontally about pivot 57 and vertically about the horizontal axis of pivots 59 for the yoke 56. The yoke 56 at the pivot pin 57 carries a rearwardly extending arm 61 which extends over the top of the platform to the rear portion where a pointer 62 is positioned to move with arm 61 over a scale 63 fixed to the platform (FIGS. 3, 4 and 5). The arm 61 carries a pad 64 to receive the vertically directed arm 65 for a second pointer 66. The arm 65 projects upwardly through the bottom of the cabinet 60 so the pointer (FIG. 5) 66 can project rearwardly through a vertical slot 67 in the back wall 68 of the cabinet and cooperate with an adjustable scale 69 carried by that wall. The scale is provided with a locking nut 70 which on being loosened will allow the scale to be moved vertically relative to pointer 66. Though not shown, the scale 69 has its opposite edges bent under to engage on a fixed guide carried by the wall 68, and the nut 70 when tightened presses on the guide.

As seen in FIGS. 6 and 6A, the arm 61 has a tab 71 fixed adjacent the pad 64. The tab 71 is engaged by a fixed sleeve nut 72 which receives a thrust screw 73 rendered operable by a knob 72. The arm 61 is not movable vertically, so when knob 74 is turned to feed the screw 73 upwardly it pushes at its upper end 75 on the bottom of the cabinet 60 to pivot the cabinet upwardly about the axis of the yoke pins 59, or when the screw is backed off it allows the cabinet to drop by its own weight about the axis of the pins 59. While the arm 61 cannot move vertically it can move horizontally and in so doing it moves the yoke 56 about the pivot 57 (FIG. 6). This movement of arm 61 is relative to the platform 48 and is effected by a screw 76 extending through a sleeve nut 76A fixed to the side of the platform 48 (FIG. 6A) and connected to the side of the sleeve nut 72 to turn relative thereto without breaking connection. The screw 76 is operated by a knob 77 to swing the arm 61, yoke 56 and cabinet 60 about pivot 57 in opposite directions.

It can be understood that knob 51 (FIG. 7A) is provided to move the platform 48 and all components carried thereon about a central pivot 50 in the carrier 46. Knob 74 (FIG. 6A) is provided to tilt the cabinet 60 vertically about the horizontal axis through the yoke arm pins 59. Knob 77 is provided to swing the cabinet 60 about the yoke pivot 57 in a horizontal plane. As seen in FIG. 3 the cabinet 60 has a front wall 78 formed with a circular opening to expose a condensing lens 79, the center of whose convex surface is marked with a circle 80. The lens 79 is located with its center substantially at the point of intersection of the axis through yoke arm pins 59 and the yoke pivot 57 so as to be substantially at the point of two degrees of freedom of adjustment of the housing about the axis through pins 59 and the axis through pivot 57.

The components associated with the cabinet, in addition to the condensing lens 79 include a front sighting panel 81 (FIGS. 3, 4 and 5) formed with a window to expose a vertical sighting element, such as wire 82, aligned in the axis of the lens 79. The cabinet also has a rear sighting panel 83 formed with a vertical peep slot 84, and on the forward surface (FIG. 3) of the panel 83 there are provided spaced parallel lines 85 on either side of the peep slot 84. The lines 85 cannot be seen from the rear of the panel 81, but will become visible when properly sighted by using the mirror 16 (FIG. 2) adjacent the rear wheel 13. The sighting means or wire 82 and the sighting peep slot 84 are located to be parallel with the axis intersecting the center 80 of the lens 79 and, as will be described presently, a target circle 97 on a photocell board 93.

The top surface of cabinet 60 carries a housing 86 for the support of an instrument panel which includes a candle-power meter 87, a cluster of indicator lamps in which lamp 88 is labeled HIGH, lamp 89 is labeled LOW, lamp 90 is labeled LEFT, and lamp 91 is labeled RIGHT. The lamps 88 and 89 are arranged to designate the vertical setting of the headlight beam and lamps 90 and 91 are arranged to designate the horizontal setting of the headlight beam, as will be explained presently. There is a window 92 formed in the cabinet top for viewing of a photocell board 93 mounted inside on the back wall 68 and aligned in the axis of lens 79. The photocell mounting board 93 is shown in FIGS. 7 and 8, and is scribed with an elongated oval target area 94 simulating the pattern of the headlight. The area 94 has a major horizontal axis 95 and a minor vertical axis 96 intersecting at the center of a target circle 97. The board 93 carries a pair of photocell elements 98 and 99 spaced equally away from the target circle 97 on the vertical axis 96, a photocell 100 on the horizontal axis 95 to the right of the target circle 97, and a pair of photocells 101 and 102 equally spaced from the target circle 97 and slightly below the horizontal axis 90. The board 93 is fixed in position so that the target circle 97 is on the axis of the lens 79 and is registered with the center circle 80 scribed on the lens 79 (FIG. 3). The array of photocells 98 to 102 are associated with an electronic circuit assembly suitably mounted in the cabinet, and a suitable power supply is obtained through the lead-in cord 103 (FIGS. 4 and 5). In addition to the meter 87, and the cluster of indicator lamps 88, 89, 90 and 91, the panel 86 on top of the cabinet 60 carries a READ/STORE switch and a HIGH BEAM/LOW BEAM switch 105.

OPERATION OF THE HEADLIGHT TESTER

When testing sealed beam headlights under SAE Standards J579b it is required that the low beam of the headlight 14 should be photoelectrically aimed such that the illumination intensity at the location of the photocell 100 (FIG. 7) is 20 percent of the maximum beam intensity, and at the same time the illumination intensity at the location of the photocell 98 is 30 percent of the maximum intensity. These values must be obtained on a screen at 25 feet (7.6m), but in order to accommodate the headlight tester to a small shop space the 25 foot measurement has been greatly condensed by the lens 79 to a distance of approximately 15 inches from the lens 79 to the photocell board 93. When testing the high beam of a sealed beam headlight by SAE Standards J579b, the photoelectric aiming should be such that equal illumination intensity is obtained at the photocells 98 and 99 on the vertical axis 96 and also at photocells 101 and 102 on the horizontal axis 95.

The headlight tester as above described is embodied in a suitable housing which incorporates electronic circuitry, and photo-electric detectors, and a headlight beam condensing lens permitting an operator to determine the existing position of the light beam from each vehicle headlight 14, with respect to a predetermined aiming axis for the light beam, as well as to monitor the adjustments of the headlight should it be required to restore the beam to its proper alignment. Normally, the headlight adjustment is performed in the low beam mode, and the high beam alignment falls where it may. If the high beam alignment exceeds the SAE tolerances then the headlight itself needs replacement. The headlight tester also is arranged to cooperate with target means 15 for calibrating the initial setting to account for existing deviations from horizontal or out-of-level conditions of the shop floor or work surface on which the vehicle is placed, as well as to account for rear wheel track of the vehicle.

In order to calibrate the headlight tester for deviation from horizontal in the slope of a shop floor, it is first necessary to place the mirror and calibration light assembly 15 on one of the rear wheels, such as the left rear wheel of the vehicle as shown in FIG. 1. As shown in FIG. 2 the assembly 15 is positioned on the rear wheel so that the levels 39 and 40 are centered thereby establishing a true horizontal and vertical position of the assembly 15. Of course, the probes 26 and the support 27 need to be adjusted to fit the wheel size and the tire size, and the beam 21 of the assembly needs to be positioned substantially opposite the center of the wheel axial. These adjustments are made so that the adjustable post 30 assumes a true vertical position and the mirror 16 is perpendicular with the plane of rotation of the wheel.

It is then necessary to position the headlight tester assembly 18 at the front of the vehicle so that it will roll across the front of the vehicle on the principal wheels 41 in a line substantially perpendicular to the longitudinal axis of the vehicle, and at a distance of 12" to 18" in front of the headlights 14. The assembly 18 is provided with a centering probe 33 which is pivotly mounted on a slidable (in and out) supporting arm 34 carried by the assembly 18 so as to project forwardly of the condensing lens 79. The probe 33 swings about its pivot 33A into a position where the probe 33 is raised and horizontally in line with the center of lens 79 so that the assembly 18 can be adjusted by moving the carriage 19 horizontally on the shop floor and by moving the carrier 46 vertically on the columns 44 until the outer end of the probe 33 is located at or close to the center of the headlight 14 at the left side of the vehicle. The assembly 18 is then moved leftwardly so that the cabinet 60 is in view of the assembly 15 mounted on the rear wheel as described above. A measurement is taken from the shop floor to the end of the probe 33 when in its raised position and that vertical distance is then used to adjust the post of assembly 15 until the light bulb 35 is at the same vertical height, after which the knob 31 is tightened down to fix the setting of the light box 17. Care must be taken that the mirror 16 is perpendicular to the plane of the vehicle wheel as will appear presently.

The operator then looks through the peep slot 84 in the rear sighting panel 83 on the headlight tester cabinet 60 and adjusts the assembly until the sighting wire 82 in the front panel 81 is directly in line with the calibration light bulb 35. With the calibration light bulb 35 on, the operator looks through the window 92 (FIG. 5) in the top of the cabinet 60 to determine where the condensing lens 79 has cast the image of the light bulb 35 on the target board 93. If the image does not center itself on the target circle 97 (see FIG. 7) the operator must adjust the vertical and horizontal aim of the cabinet 60 by using the adjusting knobs 74 and 77 until the image of the light bulb 35 falls on the target circle 97. Once the alignment, as above described has been achieved, the operator then physically adjusts the vertical scale 69 by sliding it up or down until the "zero" mark is opposite the pointer 66. The scale 69 must then be fixed in position by tightening the lock nut 70, and thereafter the scale 69 should not be disturbed.

The next operation is to bring the headlight tester into alignment with the plane of rotation of the rear wheel on which the assembly 15 is mounted. This alignment adjustment is made by using the knobs 74 and 77 until the pointers 62 and 66 are on "zero" of the respective scales 63 and 69. Following this manipulation, the operator should then sight through the peep slot 84 and by manipulating the knob 51 rotate the cabinet 60 and the platform 48 together in the horizontal plane relative to the carrier 46 until the sighting wire 82 has its reflection from mirror 16 brought into a position between the vertical lines 85 which is the indicia on the sighting panel 83 at either side of the peep slot 84. At this time the alignment of the cabinet 60 and the mirror 16 should be such that the image of the lines 85 are clearly visible in the mirror 16. This completes the calibration and alignment of the headlight tester to account for out-of-level condition of the shop floor, and for taking into account the normal line or direction of travel of the vehicle as determined by the plane of the rear wheels.

The headlight tester assembly 18 may now be rolled to a position in front of the left headlight 14 which is to be tested for alignment of the low beam, and the condensing lens 79 should be between 12" and 18" in front of the headlight 14. Again the centering probe 33 is swung to its operative position so that the assembly 18 can be set with the center circle 80 on the lens 79 at the center of the headlight, after which the probe 33 is swung to its out of the way position (FIG. 3).

Referring now to FIG. 9 there is shown a schematic electric wiring diagram which operatively relates the several photocells (FIG. 7) mounted on the photocell board 93 (FIG. 8) to the meter 87 and indicator lamp array on the panel 86. When testing or aiming the low beam filament of a headlight 14 the switch 105 must be moved to the LOW BEAM position. When the READ/STORE switch 104 is placed in the READ position a circuit is made between the photocell 98 on the vertical axis 96, a buffer amplifier 106 and a capacitor 107. The light from the vehicle headlamp 14 is allowed to enter the condensing lens 79 and fall on the array of photocells on the board 93, thereby causing the photocell 98 to develop a voltage across a resistence 108 due to the current flow directed through the switch 104 to the capacitor 107 and to the positive input of the buffer amplifier 106. The candle power meter 87 (which is shown in FIG. 5) is connected to the output of the buffer amplifier 106 and shows the intensity of light reaching the photocell 98. The operator manipulates the knobs 74 and 77 until the meter shows a maximum reading. Once the photocell has produced its response for the maximum intensity of light, the READ/STORE switch 104 is moved to the STORE position and this captures the voltage representative of the maximum beam intensity in the capacitor 107. That same voltage is supplied by the output of the buffer amplifier 106 to a resistor divider network made up of three resistors 108, 109, and 110, which for example, may have values respectively of 3.5 ohms, 0.5 ohms, and 1.0 ohms. This network of three resistors is connected to comparators 111 and 112. It can be seen that the negative input of comparator 111 is connected to the divider network at a point where the voltage will be 20% of that which is proportional to the maximum intensity of the light beam. Likewise the positive input of comparator 112 is connected to the divider network at a point where the voltage is 30% of the maximum intensity of the light beam reaching photocell 98. If the light falling on photocell 98 is so intense that the voltage developed across the resistor 108 is greater than that at the negative input of comparator 112, the output of the comparator 112 will be in a HIGH state and this will cause current flow through the LOW BEAM side of switch 105 to light the indicator lamp 90 which on the panel of FIG. 5 is labeled LEFT. This tells the operator that the light beam from the headlight is too far to the left of the vertical axis 96 and the light beam must be moved to the right. This movement of the light beam is effected by adjusting the cabinet at a knob 77. When the light beam image has been moved to the right of the vertical axis 96 so that the intensity of the light falling on photocell 98 is lower than 30% of the maximum, the voltage levels at the two inputs to comparator 112 will be unequal and will cause the comparator to light the right indicator lamp 91 which is in the circuit through the switch 105. When the adjustment of the cabinet by knob 77 results in the voltage levels in the two inputs of comparator 112 being exactly equal, both the left and the right indicator lamps 90 and 91 will be lighted. This indicates that the light intensity falling on photocell 98 is exactly 30% of the maximum, thereby indicating that the adjustment of cabinet 60 is such that the light beam is positioned correctly in the horizontal axis. The same technique as above described is applied by adjusting the cabinet 60 vertically at knob 74 for determining the alignment of the light beam from the vehicle headlight in the vertical plane, except that the voltage at the two inputs to comparator 111 when equalized is 20% instead of 30%. The comparator 111 makes this comparison between the voltage level at the 20% point on the divider network between resistors 109 and 110 so that the voltage developed across resistor 114 which is in circuit with the photocell 100 is proportional to the light intensity falling on that photocell. If the intensity is too great, the indicator lamp 88 which is in circuit through the comparator 113 will be lighted; and if the intensity is too small the low indicator lamp 89 will be lighted. When the cabinet 60 has been adjusted so that both indicator lamps 88 and 89 are lighted the vertical position of the light beam on the photocell board is correct.

The foregoing description has related the electrical circuit embodying photocells 98 and 100 with the indicator lamps 88 through 91 for the purpose of determining the alignment of the vehicle head lamp when on low beam setting of the selector switch 105. The proper alignment of the low beam in the vehicle headlight, according to SAE standards, is to have the beam in the lower right quadrant of the horizontal and vertical axes 95 and 96 so that 20% of the light intensity will reach the photocell 100 and 30% of the light intensity will reach the photocell 98. In order to satisfy the SAE standards, the present headlight tester cabinet 60 is adapted to be manipulated by knobs 74 and 77 so as to first determine the actual low beam aim from the headlight by observing the positional adjustment of the cabinet 60 through pointer 62 relative to the fixed scale 63 on the platform 48, and the moved position of the scale 69 relative to the pointer 66 which is fixed in the platform 48. If the pointer 62 which cooperates with scale 63 is on the "zero" mark between horizontally right and horizontally left, and the pointer 66 aligns with the "zero" point on the vertical scale 69 between a low and a high setting on the vertical axis, the headlight alignment will be correct. However, if the readings on the scales 63 and 69 are within 4 units off of "zero" in either horizontal or vertical alignment the headlight alignment is within acceptable tolerances. When the vehicle headlight is outside of the acceptable tolerances, the headlight tester cabinet 60 should be brought back to the "zero" alignment for pointers 66 and 62 and the headlight should then be physically adjusted on the vehicle to produce the acceptable condition where indicator lamps 88 through 91 are illuminated to show that the low beam alignment is in the lower right quadrant of the beam pattern 94 shown on the photocell board 93.

When determining the position of the high beam in the vehicle headlight 14, it is necessary to use the response of the two photocells 98 and 99 on the vertical axis and the two photocells 101 and 102 on the horizontal axis. The circuit arrangement for this test is set up (FIGS. 5 and 9) with the switch 105 shifted to the high beam position. The photocell 98 is now effectively connected to the negative input of comparator 113 and photocell 99 is connected to the positive input of comparator 113. When, by manipulating cabinet 60 by knob 74, the light intensity at photocells 98 and 99 is equal the output of the comparator 113 will energize both indicator lamps 88 and 89 thereby indicating that the high beam is located properly on the vertical axis 96. In the same manner the photocell 101 is connected to the positive input of comparator 115, and the photocell 102 is connected to the negative input of comparator 115. When, by manipulating the cabinet by knob 77, the light intensity at photocells 101 and 102 is equal, the indicator lamps 90 and 91 will be illuminated to indicate that the high beam is properly located relative to horizontal axis 95.

It can be seen from the foregoing that the array of the photocells mounted on the board 93 energize an electrical circuit which includes the candle power meter 87 and the array of indicator lamps on the panel 86, and these components are rendered operative for low beam and high beam testing and aiming through selector switches 104 and 105. In other words the means to condition the photocells and indicator lamps to respond selectively to the low beam and the high beam energizing of the vehicle headlights are the switches 104 and 105. The arrangement of the electrical components and the structure of the headlight cabinet and supporting carriage are susceptible of changes without departing from the concept of the invention.

What is claimed is:
1. In headlight testing apparatus for vehicle headlights in which the vehicle front and rear wheels are placed on a work surface, the combination of:
(A) calibration means connected to and located in the plane of rotation of a rear wheel;
(B) headlight testing means positioned ahead of the vehicle wheels and at the side of the vehicle to be in view of said calibration means, and including
  (1) a cabinet having a condensing lens mounted to align with said calibration means,
  (2) a target indicia mounted in said cabinet and spaced from said lens,
  (3) an array of photocells arranged around said target indicia with certain photocells spaced vertically above and below said target indicia, and others being spaced horizontally to the right and left of said target indicia, said target indicia being located on the focal axis of said condensing lens;
(C) sighting means carried by said cabinet in position to view said calibration means;
(D) support means for said cabinet including means to adjust the cabinet about horizontal and vertical pivot axes in cooperation with said calibration means to align the axis of said condensing lens substantially parallel with the plane of rotation of said rear wheel and with the work surface;
(E) an array of position indicator lamps corresponding with the vertical and horizontal orientation of the vehicle headlight beam; and
(F) circuit connections between said array of photocells and said indicator lamps, whereby said lamps are lit selectively or together in response to activation of said photocells by a vehicle headlight and adjustment of said cabinet,
  (1) said circuit connections including means to display the intensity of the vehicle low beam headlight as a voltage, means to store the voltage representative of the maximum intensity of the low beam headlight, and means to compare the stored voltage with the voltage of the actual low beam headlight intensity at locations of said photocells on the horizontal axis.

2. Vehicle headlight tester comprising: an array of photocell means sensitive to and capable of generating a voltage proportional to the intensity of the light beam from the vehicle headlight and arranged on opposite sides of a point of intersection of a horizontal and vertical axis; an array of indicator lamps arranged in a first pair indicative of the headlight beam aim vertically above or below the horizontal axis and arranged in a second pair indicative of the headlight beam aim horizontally to the right or left of the vertical axis; first circuit means including a selector switch, a buffer amplifier, a capacitor and a meter connected with a first photocell at one side of said horizontal axis whereby the light intensity from said latter photocell registers on said meter and the voltage is stored in said capacitor; means to change the position of said array of photocell means relative to the vehicle headlight to find the maximum light intensity reading at said meter and to store the corresponding voltage in said capacitor; second circuit means including a pair of comparators, a divider network connected into the negative side of said comparators, connections from said first photocell and from a photocell at one side of said vertical axis into the positive side of individual ones of said comparators, and a connection between said buffer amplifier output to said divider network to supply the stored voltage from said capacitor; and third circuit means from one of said comparators to said first pair of lamps and from the other one of said comparators to said second pair of lamps.

3. In headlight testing apparatus for vehicle headlights in which the vehicle front and rear wheels are placed on a work surface, the combination of:

(A) calibration means connected to and located in the plane of rotation of a rear wheel;

(B) headlight testing means positioned ahead of the vehicle wheels and at the side of the vehicle to be in view of said calibration means, and including (1) a cabinet having a condensing lens mounted to align with said calibration means, (2) a target indicia mounted in said cabinet and spaced from said lens, (3) an array of photocells arranged around said target indicia with certain photocells spaced vertically above and below said target indicia and others being spaced horizontally to the right and left of said target indicia, said target indicia being located on the focal axis of said condensing lens;

(C) sighting means carried by said cabinet in position to view said calibration means;

(D) support means for said cabinet including means to adjust the cabinet about horizontal and vertical pivot axes in cooperation with said calibration means to align the axis of said condensing lens substantially parallel with the plane of rotation of said rear wheel and with the work surface;

(E) an array of position indicator lamps corresponding with the vertical and horizontal orientation of the vehicle headlight beam; and (F) circuit connections between said array of photocells and said indicator lamps, whereby said lamps are lit selectively or together in response to activation of said photocells by a vehicle headlight and adjustment of said cabinet, (1) said circuit connections include means to display the intensity of the vehicle low beam headlight as a voltage, means to store the voltage representative of the maximum intensity of the low beam headlight, and means to compare headlight intensity at locations of said photocells on the vertical axis.

4. In vehicle headlight testing apparatus having a housing carrying means for detecting deviations of a headlight beam axis from a predetermined desired aiming axis, and means supporting the housing independently of but adjacent the headlight position of the vehicle for adjustments relative to the elevation of the headlight and for adjustments in the angular position of the housing relative to the normal line of travel of the vehicle, the improvement of: target means positionable in spaced relation from said housing along the side of the vehicle and adjacent a rear wheel, said target means having a reflective surface, means carried by the rear wheel and adapted to support said target means reflective surface perpendicular to the plane of rotation of the rear wheel to match substantially the normal line of vehicle travel dictated by the plane of rotation of said rear wheel, first and second spaced apart alignment sighting means carried by said housing in position to align said housing with said target means, said first sighting means being between said second sighting means and said target means and said reflective surface being in position to reflect the view of said first sighting means on said second sighting means to direct the position of said housing into the line of sight from said second sighting means toward said target means in adjusting the position of said housing, and means carried by said second sighting means in position to cooperate with said first sighting means in adjusting the position of said housing for reflectively aligning said first sighting means with said second sighting means to locate said housing relative to the normal line of travel of the vehicle.

5. The improvement set forth in claim 4 wherein said first sighting means is a sighting element forming a vertical line, and said means carried by said second sighting means includes a peep slot vertically aligned to cooperate with said vertical line of said first sighting element, and indicia means carried by said second sighting means in position adjacent said peep slot to be viewed through said peep slot from said housing by appearing reflected in said reflective surface of said target means for guiding the adjustment of said housing to substantially center the view of said vertical line sighting element with said spaced indicia means.

6. In headlight testing apparatus for vehicle headlights in which the vehicle front and rear wheels are placed on a work surface, the combination of: a headlight beam aim testing assembly comprising a cabinet, a cabinet transport carriage movable in a path across the front of the vehicle, cabinet support means on said carriage for bodily positioning said cabinet vertically relative to the work surface, other means on said cabinet support means operable for pivotally adjusting said cabinet about horizontal and vertical axes, pointers carried by said other means, scale means cooperating with said pointers for locating the position of said cabinet horizontally and vertically, a condensing lens carried by said cabinet in position with its optical center substantially at the point of intersection of the vertical and horizontal axes, a target indicia in said cabinet arranged on the focal axis of said lens, and an array of photocells arranged with certain thereof spaced vertically above and below said target indicia and others thereof spaced horizontally to the left and right of said target indicia; calibration means supported by a rear wheel in position to engage the wheel rim so as to be located in the plane of wheel rotation, said calibration means including a light source adjustable vertically relative to the work surface, a mirror, and means mounting said light source such that its beam is parallel to the plane of wheel rotation and mounting said mirror perpendicular to the plane of wheel rotation, said calibration means cooperating with said testing assembly whereby said cabinet is positioned by said cabinet support means and said other operable means for aligning the beam of light from said light source through said condensing lens substantially upon said target indicia; and headlight responsive electrical means including an array of position indicator lamps corresponding with the vertical and horizontal orientation of the vehicle headlight beam, and circuit connections between said photocells and said indicator lamps for activating said lamps in response to the aim of a headlight beam upon movement of said carriage to align the axis of said condensing lens substantially centered to said headlight.

7. The headlight tester apparatus as set forth in claim 6, wherein said circuit connections include switching means to condition the photocells and indicator lamps to respond selectively to low beam and high beam energizing of the vehicle headlights.

8. The headlight tester apparatus as set forth in claim 6, wherein said other means to adjust the cabinet support means is manually manipulated to position said array of photocells in said cabinet for finding the actual headlight beam axis, and said scale means responsive to cabinet adjustment displays the relation of the beam axis to a predetermined standard.

9. A vehicle headlight tester comprising: an array of headlight beam position indicator lamps arranged in a first pair indicative of the beam being high or low relative to a horizontal axis and arranged in a second pair indicative of the beam being right or left relative to a vertical axis; a first voltage comparator having an output connected to said first pair of lamps and having positive and negative voltage inputs; a second voltage comparator having an output connected to said second pair of lamps and having positive and negative voltage inputs; an array of photocells sensitive to light from the vehicle headlight and producing a voltage proportional to the headlight intensity, said photocells being representative of the horizontal and vertical axes of the headlight beam pattern; adjuster means operative to move said array of photocells relative to the vehicle headlight into a position to produce a voltage proportional to the maximum intensity of the headlight beam; circuit connections between said array of photocells and said array of indicator lamps including means to store the voltage proportional to the maximum intensity of the headlight beam, a first circuit portion connection to supply the voltage from a first selected one of said photocells to said storage means, a circuit portion to transmit the stored voltage into a divider network, said first and second voltage comparators being connected at said negative inputs into said divider network to be supplied with voltage therefrom representative of the light intensity at predetermined areas of the headlight beam pattern, a second circuit portion connection from said first selected one of said photocells directly to the positive input of one of said voltage comparators, and a separate circuit portion connection from a second selected one of said photocells directly to the positive input of the other one of said voltage comparators, whereby upon further movement of said array of photocells by said adjuster means the voltage into said voltage comparators from said voltage storing means through said divider network and directly from said second circuit portion and from said separate circuit portion is balanced and all of said indicator lamps are lighted.

10. The vehicle headlight and tester set forth in claim 9 wherein a selector switch is common to said first circuit portion to supply voltage from said first selected one of said photocells to said voltage storage means and to said second circuit portion from said selected one of said photocells to one of said comparators, said switch being movable to select either circuit portion, and said first circuit portion includes a volt meter to display the attainment of the voltage proportional to the maximum intensity of the headlight beam.

11. The vehicle headlight tester set forth in claim 9 wherein said first selected one of said photocells is located to represent the vertical axis of the headlight beam pattern, and said second selected one of said photocells, is located to represent the horizontal axis of the headlight beam pattern.

12. The vehicle headlight tester set forth in claim 9 wherein said divider network is effective to supply voltage to one of said comparators which is representative of approximately 30 percent of the maximum voltage in said voltage storage means, and to supply voltage to the other one of said 20 percent of the maximum voltage in said voltage storage means.

* * * * *